(12) United States Patent
Mishina et al.

(10) Patent No.: US 10,893,090 B2
(45) Date of Patent: Jan. 12, 2021

(54) MONITORING A PROCESS ON AN IOT DEVICE

(71) Applicant: INTERNATIONAL BUSINESS MACHINES CORPORATION, Armonk, NY (US)

(72) Inventors: Takuya Mishina, Kanagawa (JP); Naoto Sato, Kanagawa (JP); Kugamoorthy Gajananan, Tokyo (JP); Kohichi Ono, Tokyo (JP); Fumiko Akiyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/275,797

(22) Filed: Feb. 14, 2019

(65) Prior Publication Data
US 2020/0267205 A1    Aug. 20, 2020

(51) Int. Cl.
*H04L 29/08*    (2006.01)
*G06F 16/182*    (2019.01)
*G06F 16/17*    (2019.01)
*H04L 29/06*    (2006.01)

(52) U.S. Cl.
CPC ......... *H04L 67/06* (2013.01); *G06F 16/1734* (2019.01); *G06F 16/183* (2019.01); *H04L 67/12* (2013.01); *H04L 29/06* (2013.01); *H04L 29/08* (2013.01)

(58) Field of Classification Search
None
See application file for complete search history.

(56) References Cited

U.S. PATENT DOCUMENTS

| 10,050,798 B2 | 8/2018 | Nishikawa et al. |
| 2003/0200480 A1* | 10/2003 | Beattie ............ G06F 11/1456 714/13 |
| 2007/0055749 A1* | 3/2007 | Chien ............ G06F 21/1208 709/219 |
| 2016/0285904 A1* | 9/2016 | Ye ............ H04W 12/1208 |

(Continued)

FOREIGN PATENT DOCUMENTS

| CN | 104932841 A | 9/2015 |
| WO | 2018116123 A1 | 6/2018 |

OTHER PUBLICATIONS

Zheng, Cong, et al., "IoT Malware Evolves to Harvest Bots by Exploiting a Zero-day Home Router Vulnerability," https://unit42.paloaltonetworks.com/unit42-iot-malware-evolves-harvest-bots-exploiting-zero-day-home-router-vulnerability/, Jan. 2018, 9 pages.

(Continued)

*Primary Examiner* — James A Edwards
(74) *Attorney, Agent, or Firm* — Tutunjian & Bitetto, P.C.; Randall Bluestone

(57) ABSTRACT

Monitoring a process on an Internet of Things (IoT) device is performed by receiving, by the IoT device, a network data transfer from an external device; and receiving, by the IoT device, meta-information of the network data transfer. The meta-information can be generated, based on the network data transfer, by a network monitoring device. Additionally, the IoT device detects a file storing data of the network data transfer based on the meta-information. Further, the IoT device monitors a process relating to the detected file on the IoT device.

23 Claims, 7 Drawing Sheets

(56) References Cited

U.S. PATENT DOCUMENTS

| | | | |
|---|---|---|---|
| 2016/0301707 A1* | 10/2016 | Cheng | ................. H04L 63/1425 |
| 2016/0366123 A1 | 12/2016 | Smith et al. | |
| 2016/0371152 A1 | 12/2016 | Parshin et al. | |
| 2017/0093892 A1 | 3/2017 | Prokudin | |
| 2017/0289176 A1* | 10/2017 | Chen | ................... H04L 63/1408 |
| 2018/0247045 A1 | 8/2018 | David et al. | |

OTHER PUBLICATIONS

Comer, Douglas, "Packet Classification: A Faster, More Generic Alternative to Demultiplexing—The Internet Protocol Journal, vol. 15, No. 4," https://www.cisco.com/c/en/us/about/press/internet-protocol-journal/back-issues/table-contents-58/154-packet.html, Dec. 2012, 5 pages.

International Search Report and Written Opinion issued in PCT/IB2020/051129, dated Jun. 4, 2020, pp. 1-9.

\* cited by examiner ial gyazo US 10,893,090 B2

MONITORING A PROCESS ON AN IOT DEVICE

BACKGROUND

Technical Field

The present invention relates to monitoring a process on an IoT device. More specifically, the present invention relates to monitoring a process on an IoT device to collect information about malware targeting the IoT device.

Description of the Related Art

The number of malware programs targeting IoT (Internet of Things) devices is increasing, and these malware programs are becoming more sophisticated. However, typical IoT devices may not have enough computational resources to perform heavy monitoring operations in addition to their intended operations

SUMMARY

According to an embodiment of the present invention, a computer-implemented method is provided for monitoring a process on an IoT device, including receiving, by the IoT device, a network data transfer from an external device, receiving, by the IoT device, meta-information of the network data transfer, the meta-information being generated based on the network data transfer by a network monitoring device, detecting, by the IoT device, a file storing data of the network data transfer based on the meta-information, and monitoring, by the IoT device, a process relating to the detected file on the IoT device. In this way, the IoT device can offload monitoring network data transfers to a network monitoring device.

The process monitoring on the IoT device can include monitoring an execution of the detected file. By monitoring an execution of the detected file, the IoT device can monitor behaviors of executions of files transferred from external devices.

The process monitoring on the IoT device can include monitoring an access of the detected file. By monitoring an access of the detected file, the IoT device can monitor a process performing operations based on data in the detected file.

The computer-implemented method can further include storing, by the IoT device, a list of files to be monitored, and wherein the detecting includes adding the detected file to the list and the monitoring includes monitoring in response to execution of a process relating to a file in the list. In this way, the IoT device can manage a file list of the detected files to be monitored, and monitor processes relating to the detected files on the file list.

The monitoring can include adding another file to the list in response to the other file made as a result of moving or copying a file in the list. By adding the other file made as a result of moving or copying the detected file, the IoT device can monitor a process relating to a file storing data of the network data transfer even after the file identifier is changed.

According to another embodiment of the present invention, a computer implemented method is provided for monitoring a process on an IoT device, including observing, by a network monitoring device, network data transfers destined for the IoT device, detecting, by the network monitoring device, a file transfer among the network data transfers, generating, by the network monitoring device, meta-information of the file transfer, the meta-information identifying the file transfer at the IoT device, and notifying, by the network monitoring device, the IoT device of the meta-information to enable the IoT device to monitor a process relating to a file storing data of the file transfer. In this way, the network monitoring device can work outside of the IoT device to detect file transfers destined for the IoT device.

The meta-information can include a destination port number of a packet of the network data transfer. By including the destination port number in the meta-information, the IoT device can detect the network data transfer as a file transfer based on the destination port number and can detect the file transfer without checking data in the network data transfer.

The file transfer detection can be based on packet size among network data transfers. This is effective because packets of file transfers are generally larger than other types of packets, such as packets for transmitting a command or data to be used by a process executed on the IoT device.

According to another embodiment of the present invention, a computer program product is provided for monitoring a process on an IoT device. The computer program product includes one or more computer readable storage mediums collectively storing program instructions that are executable by a processor or programmable circuitry to cause the processor or programmable circuitry to perform operations including: receiving a network data transfer from an external device, receiving meta-information of the network data transfer, the meta-information being generated based on the network data transfer by a network monitoring device, detecting a file storing data of the network data transfer based on the meta-information, and monitoring a process relating to the detected file on the IoT device.

According to another embodiment of the present invention, a computer program product is provided for monitoring a process on an IoT device. The computer program product includes one or more computer readable storage mediums collectively storing program instructions that are executable by a processor or programmable circuitry to cause the processor or programmable circuitry to perform operations including: observing network data transfers destined for the IoT device, detecting a file transfer among the network data transfers, generating meta-information of the file transfer, the meta-information identifying the file transfer at the IoT device, and notifying the IoT device of the meta-information to enable the IoT device to monitor a process relating to a file storing data of the file transfer.

According to another embodiment of the present invention, a computer program product is provided for monitoring a process on an IoT device. The computer program product includes one or more computer readable storage mediums collectively storing program instructions that are executable by a processor or programmable circuitry to cause the processor or programmable circuitry to perform operations including: observing network data transfers destined for the IoT device, detecting a file transfer among the network data transfers, generating meta-information of the file transfer, the meta-information identifying the file transfer at the IoT device, and notifying the IoT device of the meta-information to enable the IoT device to monitor a process relating to a file storing data of the file transfer.

According to another embodiment of the present invention, an IoT device is provided. The IoT device includes a processor or a programmable circuitry, and one or more computer readable mediums collectively including instructions that, when executed by the processor or the programmable circuitry, cause the processor or the programmable circuitry to: receive a network data transfer from an external device, receive meta-information of the network data transfer, the meta-information being generated based on the network data transfer by a network monitoring device, detect a file storing data of the network data transfer based on the meta-information, and monitor a process relating to the detected file on the IoT device.

The summary clause does not necessarily describe all necessary features of the embodiments of the present invention. Not all features described in the summary are essential to the present invention. The present invention can also be a sub-combination of the features described above

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
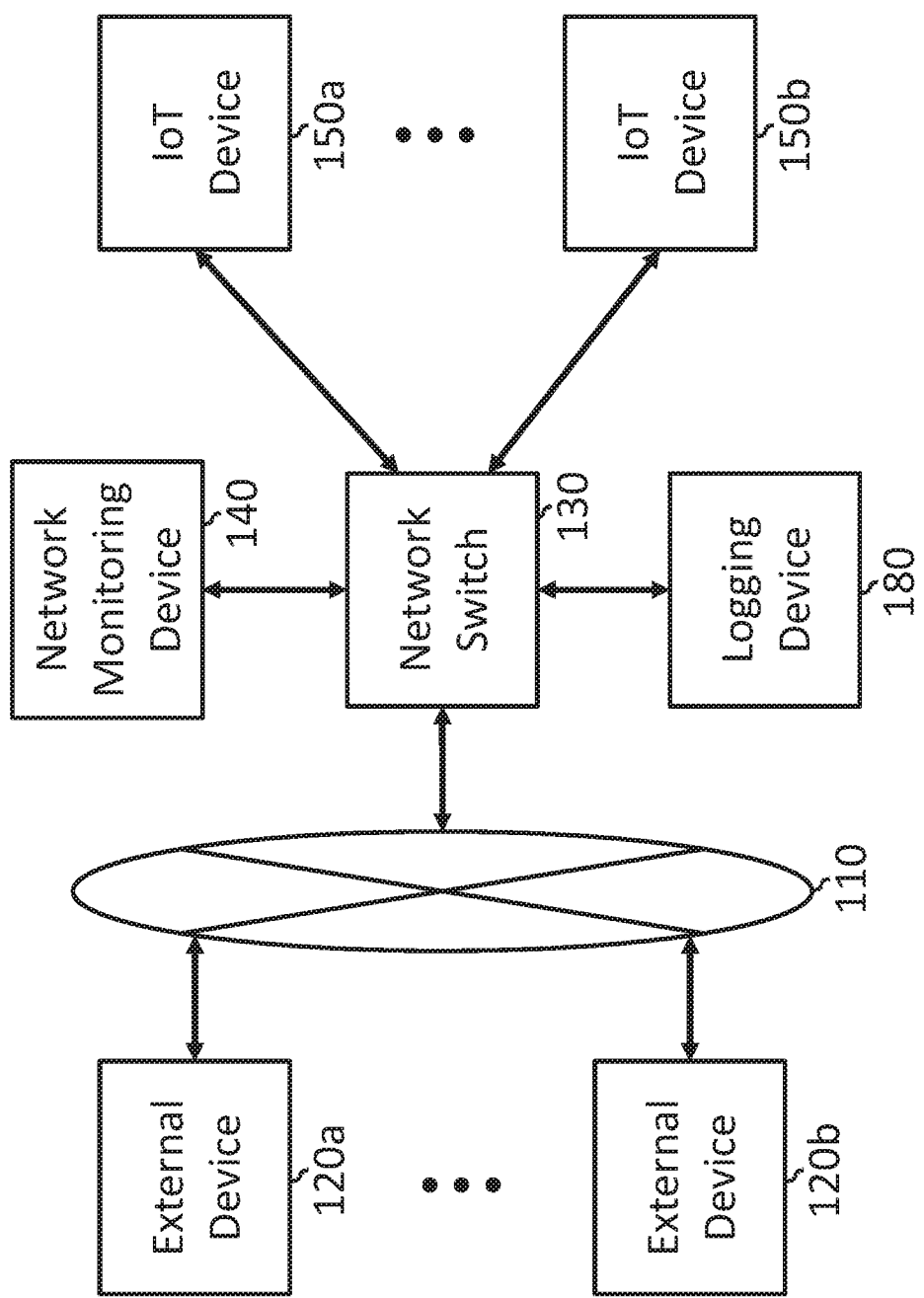
FIG. 1 shows a network environment according to an embodiment of the present invention.

FIG. 1 shows network environment 100 according to an embodiment of the present invention. Network environment 100 includes network 110, one or more external devices including external devices 120a and 120b (collectively referred to as "external devices 120") in this example, network switch 130, network monitoring device 140, one or more IoT devices including IoT devices 150a and 150b (collectively referred to as "IoT devices 150") in this example, and logging device 180.

In this embodiment, network environment 100 provides an efficient way to monitor behaviors of IoT devices 150. Ideally, it is more favorable to monitor executions of software and collect information about malware on an IoT device 150 than just monitoring data packets to and from the IoT device 150. To reduce computational workload to perform monitoring operations in IoT devices 150, network monitoring device 140 assists IoT devices 150 to monitor processes executed on them.

Network 110 can include at least one of the Internet, an intranet, a mobile network, a wide area network (WAN), and a local area network (LAN). One or more external devices 120 are connected to network 110. Each external device 120 can be a personal computer or a client computer such as a desktop computer, a portable computer, a tablet computer, or a smartphone. External device 120 can also be a server computer or a host computer such as a business server, an engineering server, or a mainframe computer. External device 120 can also be a computer system including two or more computers. Each external device 120 can access an IoT device 150 or transfer a file to IoT device 150 by sending one or more network data transfers to the IoT device 150.

Network switch 130 is connected to network 110. Network switch 130 is, for example, an IP router, a switching hub, a hub, a gateway server, a wireless station, a base station, or any other network device that can connect one or more IoT devices 150 to network 110. Network switch 130 relays communication between external devices 120 and IoT devices 150.

Network monitoring device 140 is connected to network switch 130. In this embodiment, network monitoring device 140 is a network device or a computer connected to a port of network switch 130, and monitors network transfers to one or more IoT devices 150. In an implementation, network monitoring device 140 includes a processor (e.g., a general purpose processor or a special purpose processor such as a micro-controller) or a programmable circuitry and one or more computer readable mediums collectively including instructions of a program for network monitoring device 140. In another embodiment, network monitoring device 140 is implemented as a component of network switch 130. In an implementation, network switch 130 also works as network monitoring device 140 by executing a program for network monitoring on a processor or a programmable circuitry of network switch 130.

Network monitoring device 140 assists IoT devices 150 to monitor processes executed on them. In more detail, network monitoring device 140 monitors network transfers to each IoT device 150, detects a file transfer among the network transfers, and notifies the IoT device 150 of the meta-information identifying the file transfer. This enables IoT device 150 to monitor a process relating to a file storing data of the file transfer.

One or more IoT devices 150 are connected to network switch 130. Each IoT device 150 can be a smartphone, a tablet computer, a thin-client computer, a personal computer or the like. Each IoT device 150 can also be a set top box, a home appliance, a sensor device, an actuator device, or any other device that is connectable to a network. In an implementation, IoT device 150 includes a processor or a programmable circuitry and one or more computer readable mediums collectively including instructions of a program for IoT device 150.

Each IoT device 150 can receive a network data transfer from an external device, such as external device 120, through network 110 and network switch 130. IoT device 150 also receives meta-information of any network data transfer from network monitoring device 140 through network switch 130. IoT device 150 is configured to detect a file storing data of the network data transfer based on the meta-information and monitor a process relating to the detected file. In this embodiment, IoT device 150 sends the log of monitoring the process to logging device 180 through network switch 130. In another embodiment, IoT device 150 stores the log of monitoring the process in a storage device of the local IoT device 150.

Logging device 180 is connected to network switch 130. Logging device 180 is, for example, network storage, or a server computer or a host computer such as a business server, an engineering server, or a mainframe computer. Logging device 180 can also be a personal computer or a client computer such as a desktop computer, a portable computer, a tablet computer, or a smartphone. In another implementation, logging device 180 can be included in network switch 130 or network monitoring device 140.

Logging device 180 receives the log of monitoring the process from IoT devices 150 through network switch 130 and store the log in storage of logging device 180.

Figure 2:
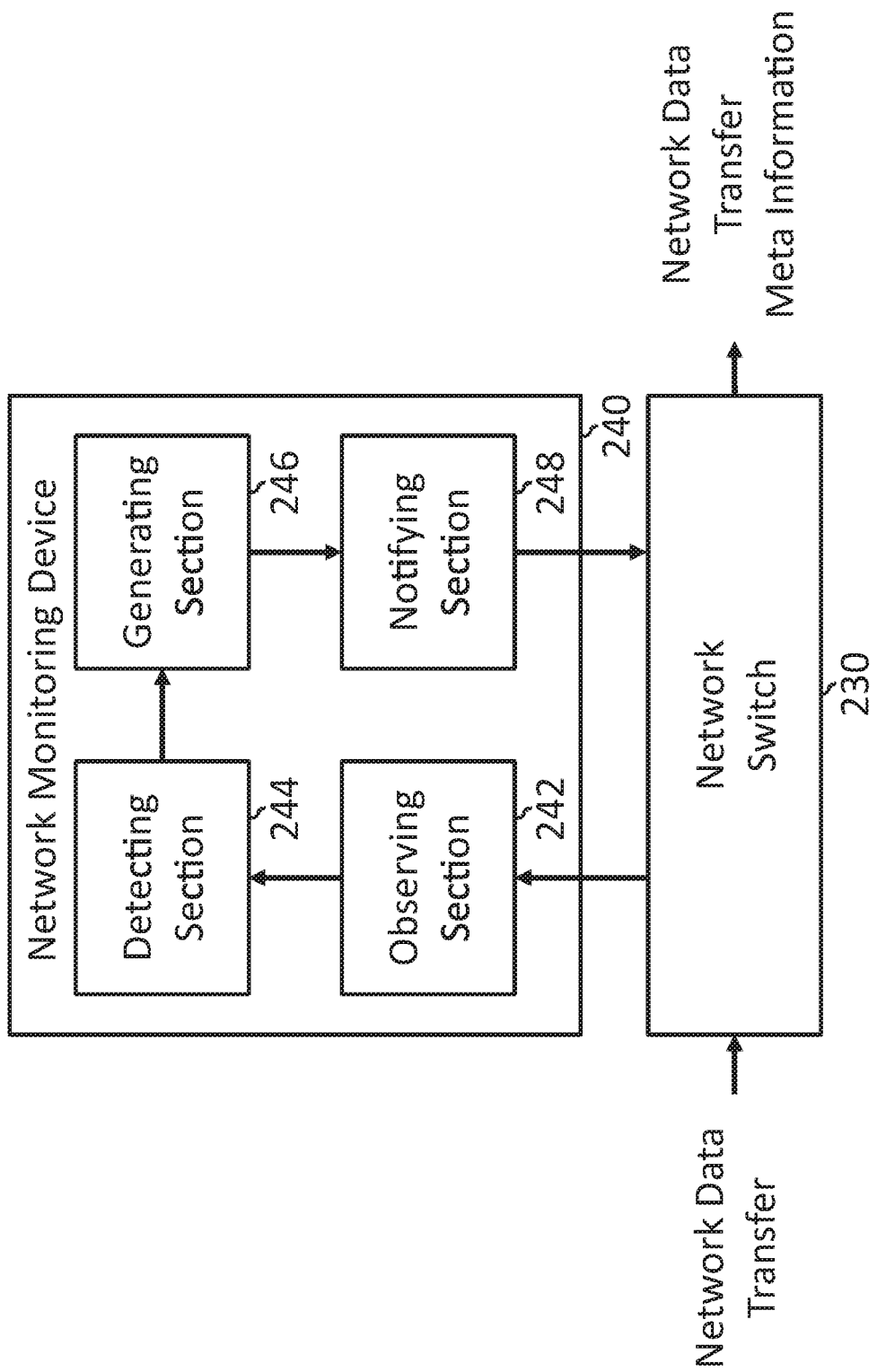
FIG. 2 shows a network monitoring device according to an embodiment of the present invention.

FIG. 2 shows a network monitoring device 240 with network switch 230 according to an embodiment of the present invention. Network monitoring device 240 can be a detailed version of network monitoring device 140 of FIG. 1 or a network monitoring device other than network monitoring device 140. Network switch 230 can be network switch 130 or a network switch other than network switch 130.

Network monitoring device 240 includes observing section 242, detecting section 244, generating section 246, and notifying section 248. Observing section 242 is connected to network switch 230. Observing section 242 observes network data transfers destined for one or more IoT devices 150. Detecting section 244 is connected to observing section 242. Detecting section 244 detects one or more file transfers among the network data transfers observed by observing section 242. Detecting section 244 sends the detected file transfers to generating section 246.

Generating section 246 is connected to detecting section 244. Generating section 246 generates meta-information of each file transfer. The meta-information is for identifying the file transfer at the IoT device. Notifying section 248 is connected to generating section 246. Notifying section 248 notifies the IoT device of the meta-information.

Figure 3:
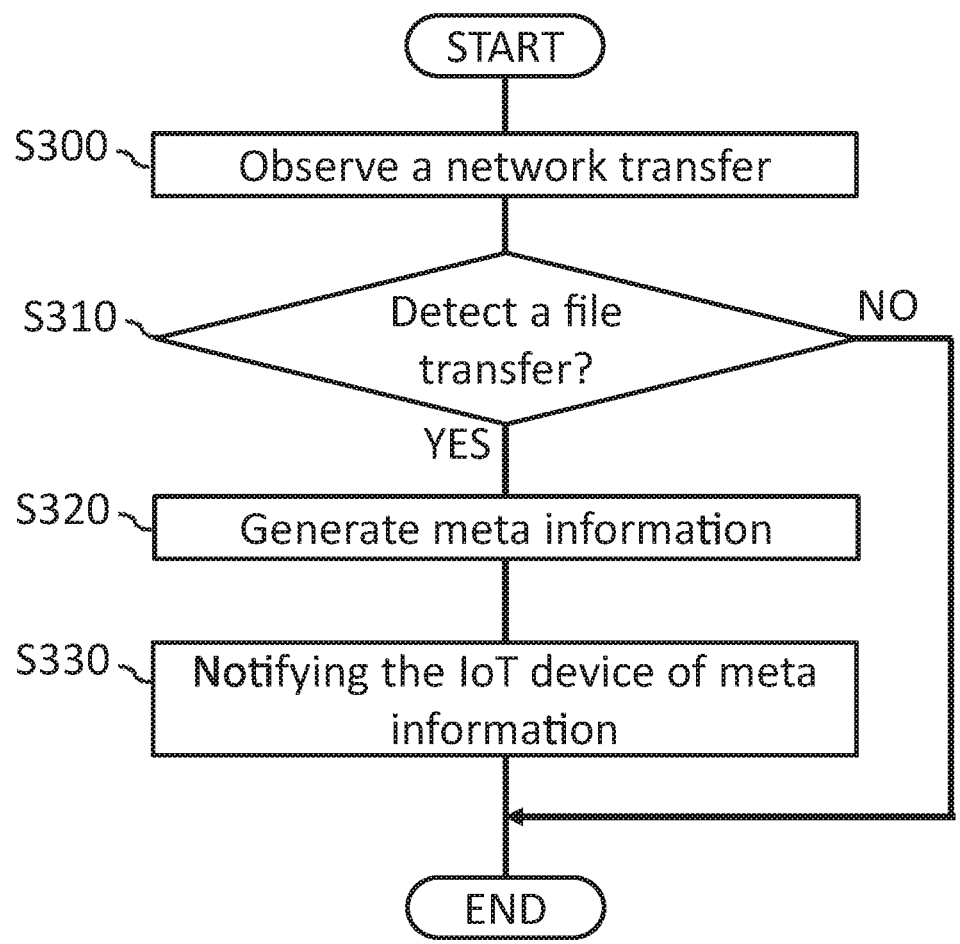
FIG. 3 shows an operational flow of a network monitoring device according to an embodiment of the present invention.

FIG. 3 shows an operational flow of a network monitoring device according to an embodiment of the present invention. The operations of FIG. 3 can be performed by, for example, network monitoring device 140 or 240 and its components that were explained in reference to FIG. 1 or 2. While the operational flow of FIG. 3 will be explained in reference to network monitoring device 240 and its components, the operational flow can be performed by other network monitoring devices having different components as well.

At S300, observing section 242 observes a network data transfer destined for one or more IoT devices 150. In this embodiment, a network data transfer is a network packet. In an implementation, observing section 242 is connected to a special port of network switch 230, and receives all network data transfers through network switch 230 from the special port of network switch 230. Observing section 242 includes an IoT device list that lists IoT devices to be monitored, and observes network data transfers destined for IoT devices 150 in the IoT device list. In another implementation, network monitoring device 240 observes network data transfers to be output from network switch 230 to a port connected to any IoT devices 150.

At S310, detecting section 244 detects whether the network data transfer is a file transfer or another type of transfer. A file transfer is a network data transfer that transmits data to be stored as a file in IoT device 150. In an implementation, detecting section 244 detects a file transfer based on packet size among network data transfers. Packets for file transfers are generally larger than other types of packets, such as packets for transmitting a command or data to be used by a process executed on IoT device 150. Therefore, in an example, detecting section 244 detects a file transfer in response to a condition that the packet size of the network transfer exceeds a threshold. This threshold can be set by a manufacturer or a user of network monitoring device 240. In another example, detecting section 244 detects a file transfer if the packet size is the maximum packet size.

In another implementation, detecting section 244 detects a file transfer based on whether the data in the network data transfer includes one or more predetermined data sequences or strings. These data sequences or strings can be set by a manufacturer or a user of network monitoring device 240.

If the network transfer is not a file transfer, then the operational flow is completed for the network data transfer of interest. If the network transfer is a file transfer, network monitoring device 240 proceeds to perform S320.

At S320, generating section 246 generates meta-information of the file transfer. Meta-information can include at least one of a time stamp, a destination port number of a packet of the file transfer, a source IP address of the packet, a source port number of the packet, a signature of the file transfer, or any other information that can be used to distinguish the file transfer or the file at IoT device 150. In another implementation, meta-information is or includes an indication or a flag inserted in the network data transfer to be transmitted to IoT device 150, and the indication or the flag indicates whether or not the network data transfer is a file transfer.

At S330, notifying section 248 notifies destination IoT device 150 of the meta-information. In this embodiment, notifying section 248 sends the meta-information to IoT device 150 through network switch 230. Notifying section 248 finishes the operations of FIG. 3 with respect to the network transfer of interest. Network monitoring device 240 performs the operations of FIG. 3 each time network monitoring device 240 observes a network data transfer.

A network monitoring device such as network monitoring device 140 and network monitoring device 240 can work outside of one or more IoT devices 150 to detect file transfers destined to one or more IoT devices 150. Therefore, embodiments of the present invention can reduce the workload placed on an IoT device 150 to monitor network data transfers received by it. By monitoring processes relating to files received from external device 120 in IoT device 150, IoT device 150 can detect abnormal behavior in most cases of malware. This is because IoT device 150 is mainly infected with malware by receiving a file including a downloader of a malware program, executing the downloader, and thereby downloading the malware program.

Figure 4:
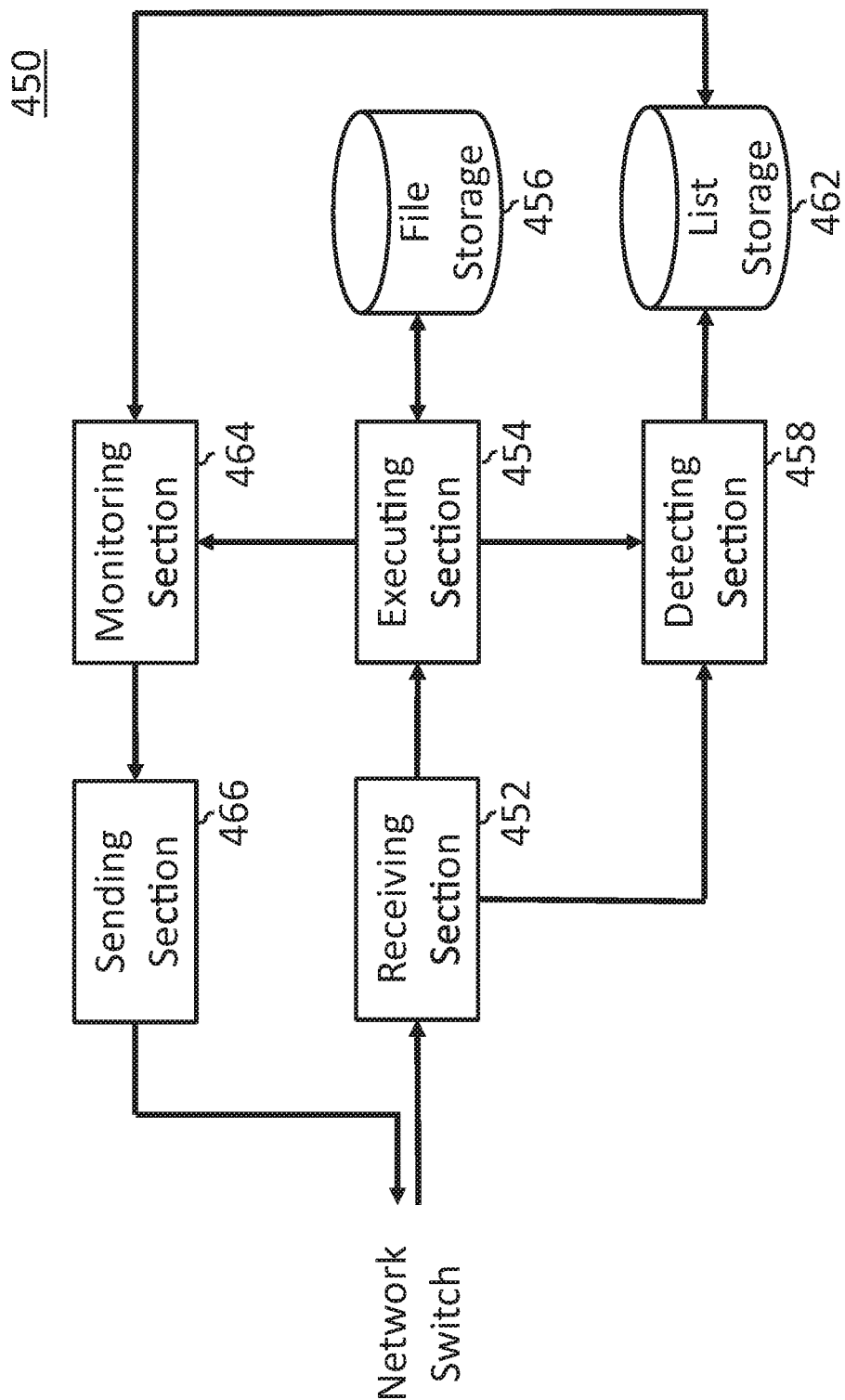
FIG. 4 shows an IoT device according to an embodiment of the present invention.

FIG. 4 shows IoT device 450 according to an embodiment of the present invention. IoT device 450 can be a detailed version of IoT device 150 of FIG. 1 or an IoT device other than IoT device 150.

IoT device 450 includes receiving section 452, executing section 454, file storage 456, detecting section 458, list storage 462, monitoring section 464, and sending section 466. Receiving section 452 receives one or more network data transfers from external devices such as external devices 120. Receiving section 452 forwards each network data transfer to a destination service or process based on the destination port number assigned to the destination service or process. Some of the ports may be reserved by OS (Operating System) services or predetermined processes, and other ports may be dynamically opened by processes requesting for assignment of ports. An OS service is also a process executed as a part of OS, and therefore "a process" is also referred to as an OS service.

Receiving section 452 also receives meta-information of each network data transfer from a network monitoring device such as network monitoring device 140 and network monitoring device 240. The meta-information is generated based on each network data transfer by a network monitoring device such as network monitoring device 140 or network monitoring device 240. In this embodiment, the network monitoring device generates and sends meta-information for each file transfer among the network data transfers, and then receiving section 452 receives meta-information for each file transfer.

Executing section 454 is connected to receiving section 452. Executing section 454 executes an OS and one or more processes executed on the OS. Each process receives a network data transfer forwarded by receiving section 452, and perform operations based on the network data transfer. Some processes store a file including data of the network data transfer in file storage 456.

File storage 456 is connected to executing section 454. File storage 456 stores files including files originally installed by a manufacturer or a user of IoT device 450, and files received from one or more external devices 120 after IoT device 450 starts operation.

Detecting section 458 is connected to receiving section 452 and executing section 454. Detecting section 458 receives meta-information of each file transfer detected by the network monitoring device. Detecting section 458 receives, from executing section 454, port assignment of each process. Detecting section 458 also receives, from executing section 454, a file identifier of a file if a process stores the file in file storage 456. Detecting section 458 detects a file storing data of the network data transfer based on the meta-information and information from executing section 454. Detecting section 458 adds the detected file to a file list stored in list storage 462.

List storage 462 is connected to detecting section 458. List storage 462 stores a file list, which is a list of files to be monitored. List storage 462 also stores a process list, which is a list of processes to be monitored and is used by monitoring section 464 for monitoring processes relating to detected files.

Monitoring section 464 is connected to executing section 454 and list storage 462. Monitoring section 464 receives information about file reads from executing section 454. Monitoring section 464 registers a process in the process list if the process relates to the detected file listed in the file list. Monitoring section 464 monitors registered processes relating to the detected files on IoT device 450. Sending section 466 is connected to monitoring section 464. Sending section 466 sends a log of monitoring the process on IoT device 450 to a logging device such as logging device 180 in FIG. 1.

Figure 5:
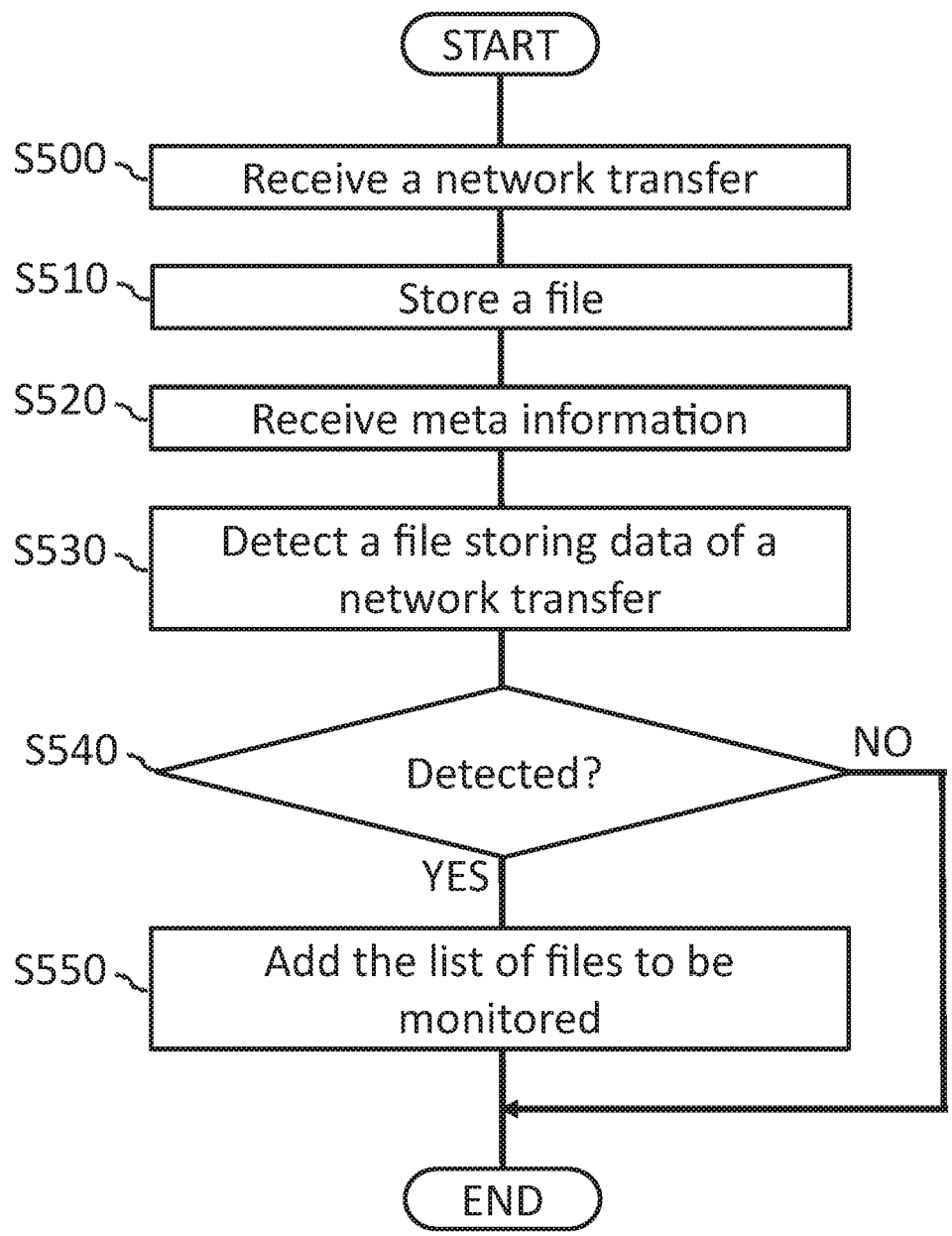
FIG. 5 shows an operational flow of an IoT device for detecting files according to an embodiment of the present invention.

FIG. 5 shows an operational flow of an IoT device for detecting files according to an embodiment of the present invention. The operations of FIG. 5 can be performed by, for example, IoT device 150 or 450 and its components that were explained in reference to FIG. 1 or 4. While the operational flow of FIG. 5 will be explained in reference to IoT device 450 and its components, the operational flow can be performed by other IoT devices having different components as well.

At S500, receiving section 452 receives a network data transfer from an external device, such as external device 120. Receiving section 452 forwards each network data transfer to a destination service or process based on the destination port number assigned to the destination service or process.

At S510, executing section 454 receives a network data transfer forwarded by receiving section 452. If the network data transfer is a file transfer, the process that receives the network data transfer requests to store a file including data in the file transfer, and then executing section 454 stores the file in file storage 456.

At S520, receiving section 452 also receives meta-information of the network data transfer from a network monitoring device such as network monitoring device 140 and network monitoring device 240 if the network monitoring device detects that the network data transfer is a file transfer.

At S530, detecting section 458 receives meta-information of the file transfer from receiving section 452. Detecting section 458 detects a file storing data of the network data transfer based on the meta-information. In one method, executing section 454 sends a port assignment of each process. Executing section 454 also sends a set of a process identifier and a file identifier for any processes identified by the process identifier that request storing a file identified by the file identifier. Detecting section 458 obtains a destination port number from the meta-information of the file transfer, and finds a process having an assignment of the destination port. Then, detecting section 458 can detect a file stored by the process having the assignment of the destination port. By detecting the file storing data of the file transfer by checking the destination port number, IoT device 450 can detect the file without scanning data in the file.

In one implementation, there can be some delay between receiving a file transfer from a network switch and receiving corresponding meta-information from a network monitoring device. In this case, network monitoring device 140 can include a time stamp in the meta-information, and then detecting section 458 can find a process having an assignment of the destination port at the time indicated by the time stamp.

In another method, detecting section 458 scans files newly stored in file storage 456 and detects whether each file includes a portion having a signature identical to a signature indicated by the meta-information. A signature can be a data string of a portion of a file, a hash of a portion of the file, or a hash of the entire file. If the signature of a file is identical to the signature of the meta-information, detecting section 458 detects the file as storing data of the file transfer. In one implementation, detecting section 458 detects the file only if the file is stored in file storage 456 during a predetermined time period from the time indicated by the time stamp. By detecting the file storing data of the file transfer by checking signatures of the file transfer and the file, IoT device 450 can detect any files including at least a portion of the file transfer. Detecting section 458 can use two or more methods, such as foregoing methods to detect a file storing data of the network data transfer.

At S540, detecting section 458 checks whether a file storing data of the file transfer is detected. If the file is detected (YES at S540), detecting section 458 adds the detected file to the file list in list storage 462 at S550. In one implementation, detecting section 458 registers the file as a target file of a change notification service, such as "inotify" of LINUX®. By using the change notification service, monitoring section 464 can receive file system events (e.g., open, close, move, rename, delete, change attribute and so on) of the target file. In this case, detecting section 458 can register, in the OS executed in executing section 454, the file as a target file of a change notification service instead of adding the file to the file list in list storage 462.

The IoT device such as IoT device 450 performs the operational flow of FIG. 5 each time it receives a network data transfer. By performing the operational flow of FIG. 5, the IoT device can estimate whether each network data transfer is a file transfer or not, and detect a file storing data of a file transfer. Then, the IoT device can create a file list, which lists detected files storing data of file transfers.

Figure 6:
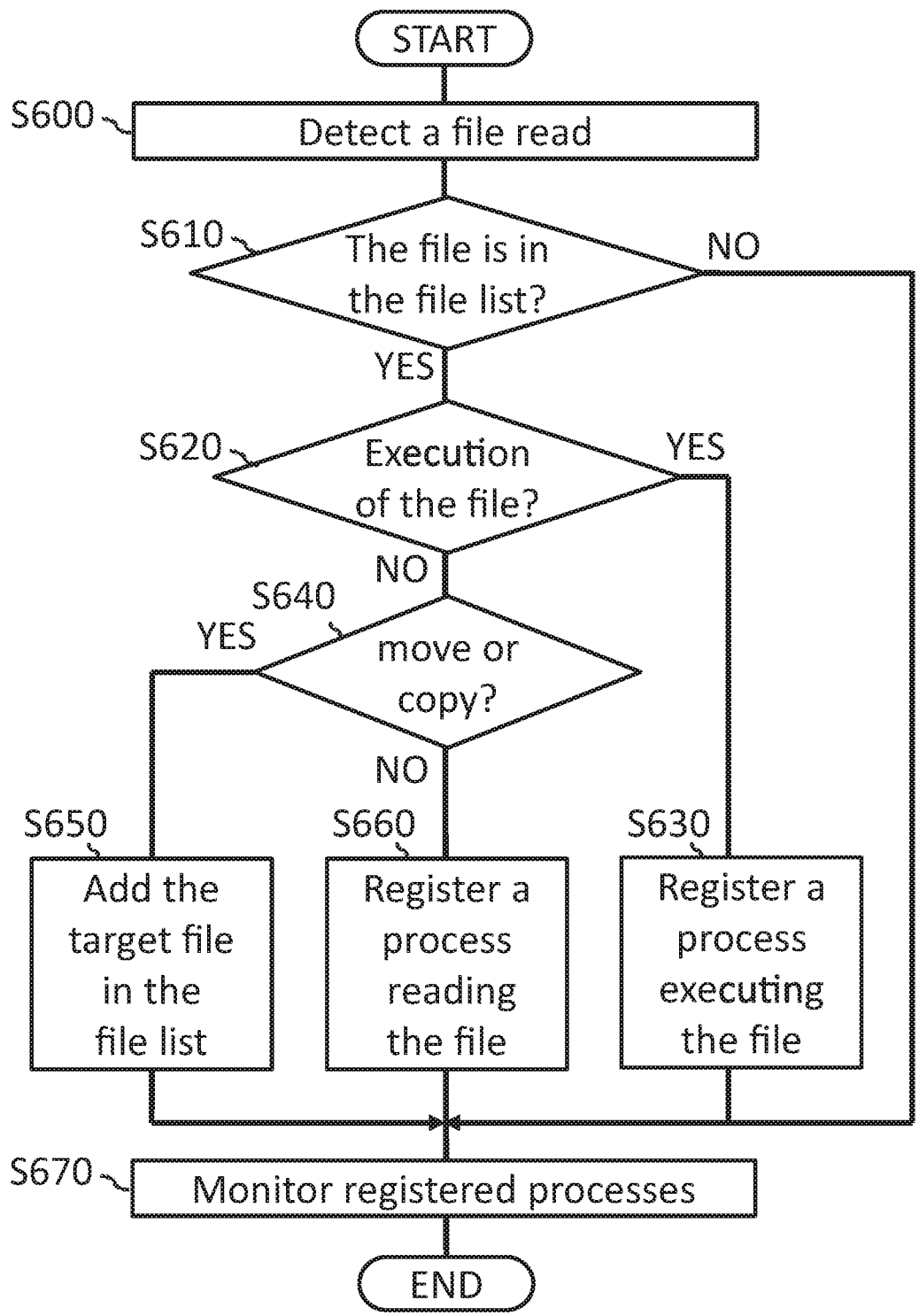
FIG. 6 shows an operational flow of an IoT device for detecting and monitoring processes to be monitored according to an embodiment of the present invention.

FIG. 6 shows an operational flow of an IoT device for detecting and monitoring processes according to an embodiment of the present invention. The operations of FIG. 6 can be performed by, for example, IoT device 150 or 450 and its components that were explained in reference to FIG. 1 or 4. While the operational flow of FIG. 6 will be explained in reference to IoT device 450 and its components, the operational flow can be performed by other IoT devices having different components as well.

At S600, executing section 454 detects a file read and notifies monitoring section 464 of the file read. In one implementation, a hook is inserted in a file access API of the OS on the IoT device. If the file access API is called from a process, monitoring section 464 receives a notification such as a subroutine call, a jump, a message, an event, or an interrupt from the hook inserted in the file access API. If IoT device 450 uses a change notification service, executing section 454 issues a file system event to monitoring section 464.

At S610, monitoring section 464 receives a notification in response to a process accessing a file, and checks whether the file is listed in the file list. If the file is not in the file list, monitoring section 464 determines not to monitor a process relating to the file and completes the operational flow of FIG. 6. In some embodiments, executing section 454 only issues notifications for files storing data of file transfers, in which case monitoring section 464 can skip S610.

At S620, monitoring section 464 checks whether the file is read for executing the file. For example, a file is executed if a process or a user requests to execute the file as an executable. If the file is read for execution (YES at S620), then monitoring section 464 adds the process executing the file in the process list at S630.

At S640, monitoring section 464 checks whether the file read is for moving or copying the file. Monitoring section 464 can also check whether the file read is for copying at least a portion of the file, or renaming the file if the file identifier is changed by the renaming. At S650 (YES at S640), monitoring section 464 adds another file to the file list in response to the other file made as a result of moving or copying a file in the file list. By adding the other file made as a result of moving or copying the detected file, IoT device 450 can monitor a process relating to a file storing data of a file transfer even after the file identifier is changed.

At S660 (NO at S640), monitoring section 464 registers a process reading the file in the file list. A process reading the file performs operations based on data in the file, and then the process can behave abnormally if the file includes malicious data. Some files may not include executable binary code, but can still include a script or code that can be executed when it is input to an interpreter or a JIT compiler (e.g., a shell or "Java®" command). In this embodiment, monitoring section 464 registers a process of such interpreter or JIT compiler in list storage 462, and monitors behavior of such interpreter or JIT compiler executing the detected file.

Monitoring section 464 performs operations of S600 to S660 each time when a file read relating to a new process is detected. At S670, monitoring section 464 monitors the behavior of a process in response to execution of the process relating to a file in the file list. In more detail, monitoring section 464 monitors an execution of the detected file or an access of the detected file.

During monitoring, monitoring section 464 generates a log of monitoring the process. For example, the log includes a history of behavior of the process such as file I/Os of the process, network communications of the process, executions of other files in file storage 456, configuration changes of IoT device 450 caused by the process, and any other behavior that can be useful to analysis of activities of malicious software. In response to completion or termination of a monitored process, list storage 462 removes registration of the monitored process in the process list.

Sending section 466 sends the log to logging device 180, and logging device 180 stores the log. In another embodiment, monitoring section 464 stores the log in storage of the local IoT device 150 instead of, or in parallel with, sending the log to logging device 180. By monitoring and logging the behaviors of processes relating to the detected files, a manager or a user of IoT devices 150 can monitor whether IoT devices 150 are performing normal operations or not. If some of the IoT devices 150 behave abnormally, the manager or the user can analyze the behavior of processes relating to the detected files, and find a malicious process or a malicious file.

In embodiments of the present invention, the monitoring section 464 or the logging device 180 can be configured to perform protective functions when a monitored process or file exhibits abnormal or malicious behavior. Examples of protective functions that can be implemented by the monitoring section 464 or the logging device 180 include quarantining the suspected malicious processes and files, force termination of the suspected malicious processes, providing an alert signal, such as an audible alarm, graphical alert, or predefined sequence of light pulses.

Various embodiments of the present invention can be described with reference to flowcharts and block diagrams whose blocks can represent (1) steps of processes in which operations are performed or (2) sections of apparatuses responsible for performing operations. Certain steps and sections can be implemented by dedicated circuitry, programmable circuitry supplied with computer-readable instructions stored on computer-readable media, and/or processors supplied with computer-readable instructions stored on computer-readable media. Dedicated circuitry can include digital and/or analog hardware circuits and can include integrated circuits (IC) and/or discrete circuits. Programmable circuitry can include reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
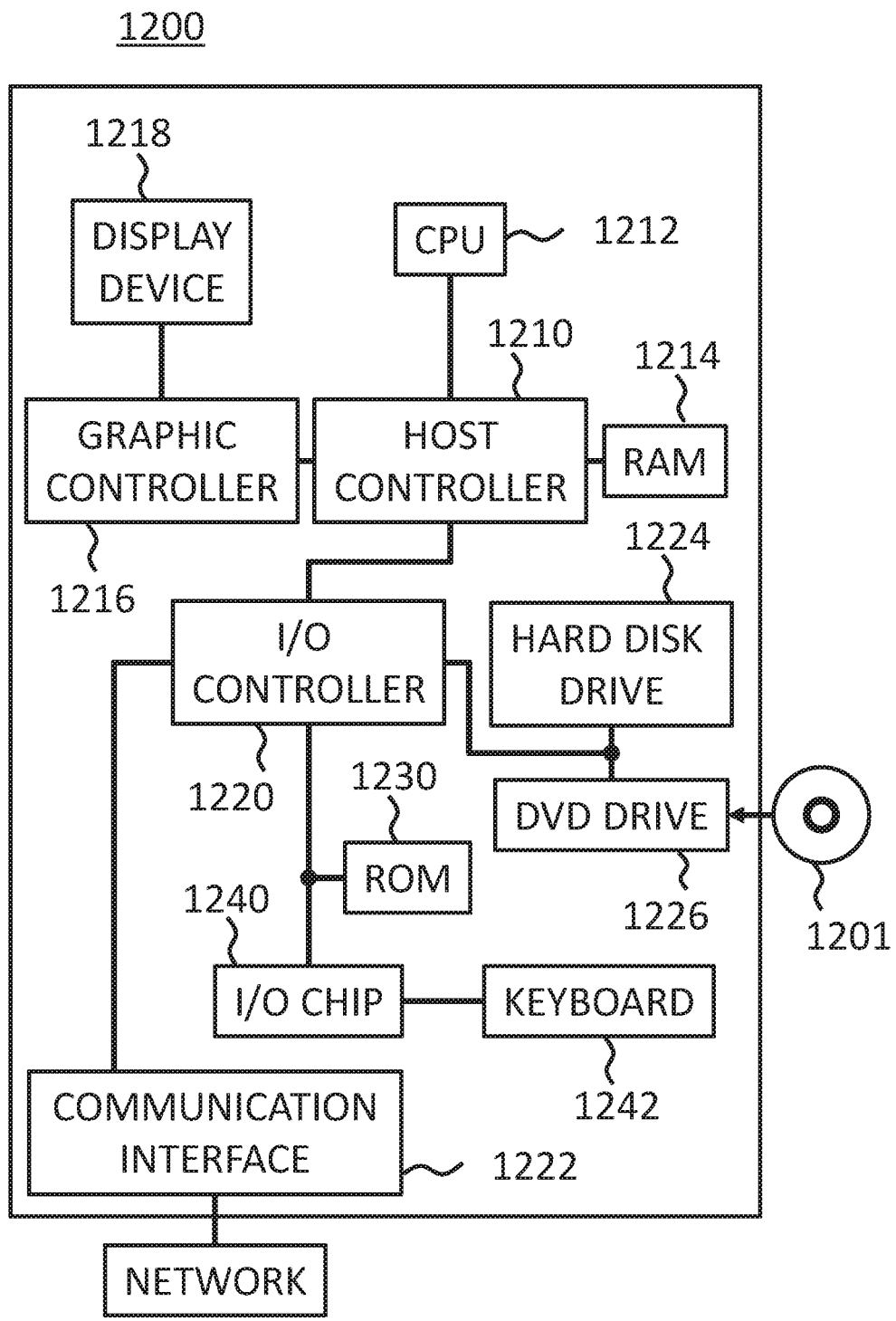
FIG. 7 shows an exemplary hardware configuration of a computer according to an embodiment of the present invention.

FIG. 7 shows an example of a computer 1200 in which aspects of the present invention can be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program can be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 can also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method can be constituted by realizing the operation or processing of information in accordance with the usage of the computer 1200.

For example, when communication is performed between the computer 1200 and an external device, the CPU 1212 can execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 can cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 can then write back the processed data to the external recording medium.

Various types of information, such as various types of programs, data, tables, and databases, can be stored in the recording medium to undergo information processing. The CPU 1212 can perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 can search for information in a file, a database, etc., in the recording medium. For example, when a plurality of entries, each having an attribute value of a first attribute associated with an attribute value of a second attribute, are stored in the recording medium, the CPU 1212 can search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules can be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method for monitoring a process on an Internet of Things (IoT) device, comprising:
   receiving, by the IoT device, a network data transfer from an external device;
   receiving, by the IoT device, meta-information including a destination port number of a packet of the network data transfer, the meta-information being generated based on the network data transfer by a network monitoring device;
   detecting, by the IoT device, a file storing data of the network data transfer to identify a detected file based on the meta-information, the destination port number enabling identification of the detected file without scanning data in the detected file; and
   monitoring, by the IoT device, a process relating to the detected file on the IoT device.

2. The computer-implemented method of claim 1, wherein monitoring the process by the IoT device includes monitoring an execution of the detected file.

3. The computer-implemented method of claim 1, wherein monitoring the process by the IoT device includes monitoring an access of the detected file.

4. The computer-implemented method of claim 1, further comprising storing, by the IoT device, a list of files to be monitored, and
   wherein detecting includes adding the detected file to the list and monitoring includes monitoring in response to execution of a process relating to a file in the list.

5. The computer-implemented method of claim 4, wherein monitoring includes adding another file to the list in response to the other file made as a result of moving or copying a file in the list.

6. The computer-implemented method of claim 1, wherein the meta-information further includes at least one of a time stamp and a signature of the network data transfer.

7. The computer-implemented method of claim 1, further comprising sending, by the IoT device, a log of results of monitoring the process by the IoT device to a logging device.

8. The computer implemented method of claim 1, further comprising:
observing, by the network monitoring device, network data transfers destined for the IoT device;
detecting, by the network monitoring device, a file transfer among the network data transfers;
generating, by the network monitoring device, meta-information of the file transfer; and
notifying, by the network monitoring device, the IoT device of the meta-information.

9. The computer implemented method of claim 8, wherein the file transfer is detected based on packet size among network data transfers.

10. A computer implemented method for monitoring a process on an Internet of Things (IoT) device, comprising:
observing, by a network monitoring device, network data transfers destined for the IoT device;
detecting, by the network monitoring device, a file transfer among the network data transfers;
generating, by the network monitoring device, meta-information including a destination port number of a packet of the file transfer, the meta-information identifying the file transfer at the IoT device; and
notifying, by the network monitoring device, the IoT device of the meta-information to enable the IoT device to identify the file transfer and monitor a process relating to a file storing data of the file transfer, the destination port number enabling identification of the file without scanning data in the file.

11. The computer implemented method of claim 10, wherein detecting the file transfer is based on packet size among network data transfers.

12. A computer program product for monitoring a process on an IoT device, the computer program product including one or more computer readable storage mediums collectively storing program instructions that are executable by a processor or programmable circuitry to cause the processor or programmable circuitry to perform operations comprising:
receiving a network data transfer from an external device;
receiving meta-information including a destination port number of a packet of the network data transfer, the meta-information being generated based on the network data transfer by a network monitoring device;
detecting a file storing data of the network data transfer to identify a detected file based on the meta-information, the destination port number enabling identification of the detected file without scanning data in the detected file; and
monitoring a process relating to the detected file on the IoT device.

13. The computer program product of claim 12, wherein monitoring the process by the IoT device includes monitoring an execution of the detected file.

14. The computer program product of claim 12, wherein monitoring the process by the IoT device includes monitoring an access of the detected file.

15. The computer program product of claim 12, wherein the operations further comprising storing, by the IoT device, a list of files to be monitored, and
wherein detecting includes adding the detected file to the list and the monitoring includes monitoring in response to execution of a process relating to a file in the list.

16. The computer program product of claim 15, wherein monitoring includes adding another file to the list in response to the other file made as a result of moving or copying a file in the list.

17. A computer program product for monitoring a process on an Internet of Things (IoT) device, the computer program product including one or more computer readable storage mediums collectively storing program instructions that are executable by a processor or programmable circuitry to cause the processor or programmable circuitry to perform operations comprising:
observing network data transfers destined for the IoT device;
detecting a file transfer among the network data transfers;
generating meta-information including a destination port number of a packet of the file transfer, the meta-information identifying the file transfer at the IoT device; and
notifying the IoT device of the meta-information to enable the IoT device to identify the file transfer and monitor a process relating to a file storing data of the file transfer, the destination port number enabling identification of the file without scanning data in the file.

18. The computer program product of claim 17, wherein detecting the file transfer is based on packet size among network data transfers.

19. An Internet of Things (IoT) device comprising:
a processor or a programmable circuitry;
a network interface circuit; and
one or more computer readable mediums collectively including instructions that, when executed by the processor or the programmable circuitry, cause the processor or the programmable circuitry to:
receive a network data transfer from an external device via the network interface circuit;
receive meta-information including a destination port number of a packet of the network data transfer via the network interface circuit, the meta-information being generated based on the network data transfer by a network monitoring device;
detect a file storing data of the network data transfer to identify a detected file based on the meta-information, the destination port number enabling identification of the detected file without scanning data in the detected file; and
monitor a process relating to the detected file on the IoT device.

20. The IoT device of claim 19, wherein the monitoring of the process on the IoT device includes monitoring an execution of the detected file.

21. The IoT device of claim 19, wherein the monitoring of the process on the IoT device includes monitoring an access of the detected file.

22. The IoT device of claim 19, wherein the instructions further cause the processor or the programmable circuitry to store a list of files to be monitored, and wherein detecting includes adding the detected file to the list and the monitoring includes monitoring in response to execution of a process relating to a file in the list.

23. The IoT device of claim 22, wherein the monitoring of the process on the IoT device includes adding another file to the list in response to the other file made as a result of moving or copying a file in the list.

* * * * *